United States Patent
Huang et al.

(10) Patent No.: US 10,114,261 B2
(45) Date of Patent: Oct. 30, 2018

(54) LIQUID CRYSTAL PANELS AND LIQUID CRYSTAL DEVICES

(71) Applicant: Wuhan China Star Optoelectronics Technology Co., Ltd., Wuhan, Hubei (CN)

(72) Inventors: Chun-hung Huang, Guangdong (CN); Zhenzhou Xing, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 44 days.

(21) Appl. No.: 15/317,402

(22) PCT Filed: Sep. 13, 2016

(86) PCT No.: PCT/CN2016/098810
§ 371 (c)(1),
(2) Date: Dec. 8, 2016

(87) PCT Pub. No.: WO2018/028017
PCT Pub. Date: Feb. 15, 2018

(65) Prior Publication Data
US 2018/0210302 A1    Jul. 26, 2018

(30) Foreign Application Priority Data

Aug. 10, 2016 (CN) .......................... 2016 1 0649289

(51) Int. Cl.
*G02F 1/1362* (2006.01)
*G02F 1/1343* (2006.01)
(Continued)

(52) U.S. Cl.
CPC .... *G02F 1/136286* (2013.01); *G02F 1/13306* (2013.01); *G02F 1/134309* (2013.01); *G09G 3/3611* (2013.01); *G02F 2001/134345* (2013.01)

(58) Field of Classification Search
CPC ........... G02F 1/136286; G02F 1/13306; G02F 1/134309; G02F 2001/134345; G09G 3/3611
See application file for complete search history.

(56) References Cited

U.S. PATENT DOCUMENTS

| 2005/0127946 A1 | 6/2005 | Chen |
| 2009/0085927 A1* | 4/2009 | Jung .................... G09G 3/3648 345/606 |
| 2016/0055811 A1* | 2/2016 | Zhu ...................... G09G 3/3648 345/214 |

FOREIGN PATENT DOCUMENTS

| CN | 101398584 A | 4/2009 |
| CN | 104123920 A | 10/2014 |

(Continued)

*Primary Examiner* — Abhishek Sarma
(74) *Attorney, Agent, or Firm* — Andrew C. Cheng

(57) ABSTRACT

The present invention discloses a liquid crystal panel and a liquid crystal device (LCD). The liquid crystal panel includes a first side, a second side opposite to the first side, and a third side. The liquid crystal panel further includes at least one gate on array (GOA) circuit. The GOA circuit includes a plurality of GOA units, and each of the GOA units includes a signal buffer. configured to buffer received gate driving signals, and to provide the buffered gate driving signals to the corresponding gate lines. Dimensions of the signal buffer of each of the GOA unit are in an increasing order along a direction from the first side toward the second side, or numbers of the signal buffers of each of the GOA units are in the increasing order along the direction from the first side toward the second side.

10 Claims, 7 Drawing Sheets

(51) Int. Cl.
     *G09G 3/36*      (2006.01)
     *G02F 1/133*     (2006.01)

(56) References Cited

FOREIGN PATENT DOCUMENTS

| | | |
|---|---|---|
| CN | 104252079 A | 12/2014 |
| CN | 105161062 A | 12/2015 |
| CN | 105304008 A | 2/2016 |
| CN | 105633122 A | 6/2016 |
| CN | 105788557 A | 7/2016 |
| CN | 105807470 A | 7/2016 |
| JP | 2011227250 A | 11/2011 |
| KR | 20020056093 A | 7/2002 |

\* cited by examiner

411

LIQUID CRYSTAL PANELS AND LIQUID CRYSTAL DEVICES

CROSS REFERENCE

This application claims the priority of Chinese Patent Application No. 201610649289.9, entitled "Liquid crystal panels and liquid crystal devices", filed on Aug. 10, 2016, the disclosure of which is incorporated herein by reference in its entirety.

FIELD OF THE INVENTION

The present invention relates to a flat display technology field, and more particularly to a liquid crystal panel and a liquid crystal device (LCD).

BACKGROUND OF THE INVENTION

A liquid crystal panel usually includes a plurality of data lines and a plurality of gate lines arranged along rows and columns. The liquid crystal panel also includes a data driving chip arranged close to one lateral side of the liquid crystal panel for providing data signals for the data lines. Due to the resistors on the data lines, when the data signals are transmitted on the data lines, distortion may occur. Usually, the transmission delay may be smaller when the data signals are transmitted on the data lines closer to the data driving chip, and the transmission delay may be greater when the data signals are transmitted on the data lines farther away from the data driving chip. Thus, when the liquid crystal panel display images or videos, the uniformity of the displayed image or displayed video on the liquid crystal panel may be not good enough.

SUMMARY OF THE INVENTION

In one aspect, a liquid crystal panel includes: a plurality of data lines and a plurality of gate lines, the data lines extend along a first direction and are spaced apart along a second direction, the gate lines extend along the second direction and are spaced apart along the first direction, the liquid crystal panel includes a first side, a second side, and a third side, the first side is opposite to the second side, and the direction from the first side toward the second side forms the first direction, the third side respectively intersects with the first side and the second side, the liquid crystal panel also includes a data driving chip and at least one gate on array (GOA) circuit, the data driving chip is arranged to be close to the first side, and is configured to provide data signals to the data lines, one of the GOA circuit is arranged to be close to the third side, the GOA circuit includes a plurality of GOA units, each of the GOA units includes a signal buffer, the signal buffer is configured to buffer received gate driving signals, and to provide the buffered gate driving signals to the corresponding gate lines, dimensions of the signal buffer of each of the GOA unit are in an increasing order along a direction from the first side toward the second side, or numbers of the signal buffers of each of the GOA units are in the increasing order along the direction from the first side toward the second side.

Wherein when the dimensions of the signal buffer within each of the GOA unit are gradually increased along the direction from the first side to the second side, the dimensions of the signal buffer within each of the GOA unit are linearly increased along the direction from the first side to the second side.

Wherein when the dimensions of the signal buffer within each of the GOA unit are gradually increased along the direction from the first side to the second side, starting from the first GOA unit located close to the first side, N number of adjacent GOA unit are defined as a GOA unit set, and different GOA unit set includes different GOA units, with respect to the same GOA unit set, the dimension of the signal buffer are the same, with respect to different GOA unit set, the dimensions of the signal buffer within the GOA unit set are linearly increased along the direction from the first side to the second side, wherein N is a positive integer.

Wherein the signal buffer includes a three-level reverse buffer.

Wherein the dimension of the signal buffer includes a coverage of the signal buffer.

Wherein when numbers of the signal buffer within each of the GOA unit are gradually increased along the direction from the first side to the second side, the numbers of the signal buffer within each of the GOA unit are linearly increased along the direction from the first side to the second side.

Wherein when the numbers of the signal buffer within each of the GOA units are gradually increased along the direction from the first side to the second side, starting from the first GOA unit located close to the first side, the adjacent GOA units corresponding to N number of gate lines are defined as one GOA unit set, and different GOA unit set includes GOA units corresponding to different gate lines, with respect to the same GOA unit set, the numbers of the signal buffers are the same, with respect to different GOA unit set, the numbers of the signal buffer within the GOA unit set are linearly increased along the direction from the first side to the second side, wherein N is a positive integer.

Wherein the liquid crystal panel includes two GOA circuits, wherein one of the GOA circuits is arranged to be close to the third side, and the other GOA circuit is arranged to be close to a fourth side opposite to the third side, wherein the fourth side respectively intersects with the first side and the second side.

Wherein the liquid crystal panel includes a Gamma voltage driving circuit having a line buffer, a level shifter, a Gamma voltage output unit, a digital-to-analog (DAC) converter, and a buffer unit, the line buffer is configured to receive serial grayscale signals of RGB sub-pixels, and to convert the serial grayscale signals of RGB sub-pixels into parallel grayscale signals of the RGB sub-pixels, wherein the serial grayscale signals of the RGB sub-pixels are serial signals, and the parallel grayscale signals of the RGB sub-pixels are parallel signals, the level shifter is configured to raise the voltage of the parallel grayscale signals of the RGB sub-pixel to a predetermined voltage, the Gamma voltage output unit generates an analog Gamma voltage, and outputs the analog Gamma voltage to the DAC converter, the DAC converter is configured to convert the analog Gamma voltage to a digital Gamma voltage in accordance with the parallel grayscale signals of the RGB sub-pixel having the raised voltage, the buffer unit is configured to output the buffered digital Gamma signals to corresponding pixel electrodes of the liquid crystal panel.

In view of the above, by configuring the dimensions of the signal buffer within each of the GOA unit to be linearly increased along the direction from the first side to the second side, or by configuring the numbers of the signal buffer within each of the GOA unit to be linearly increased along the direction from the first side to the second side, the distortion among the data signals transmitted on the data line close to the second side and the data line close to the first side may be reduced, such that the uniformity of the image or the video displayed by the liquid crystal panel may be enhanced.

In another aspect, a LCD includes the liquid crystal panel in the above embodiments.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
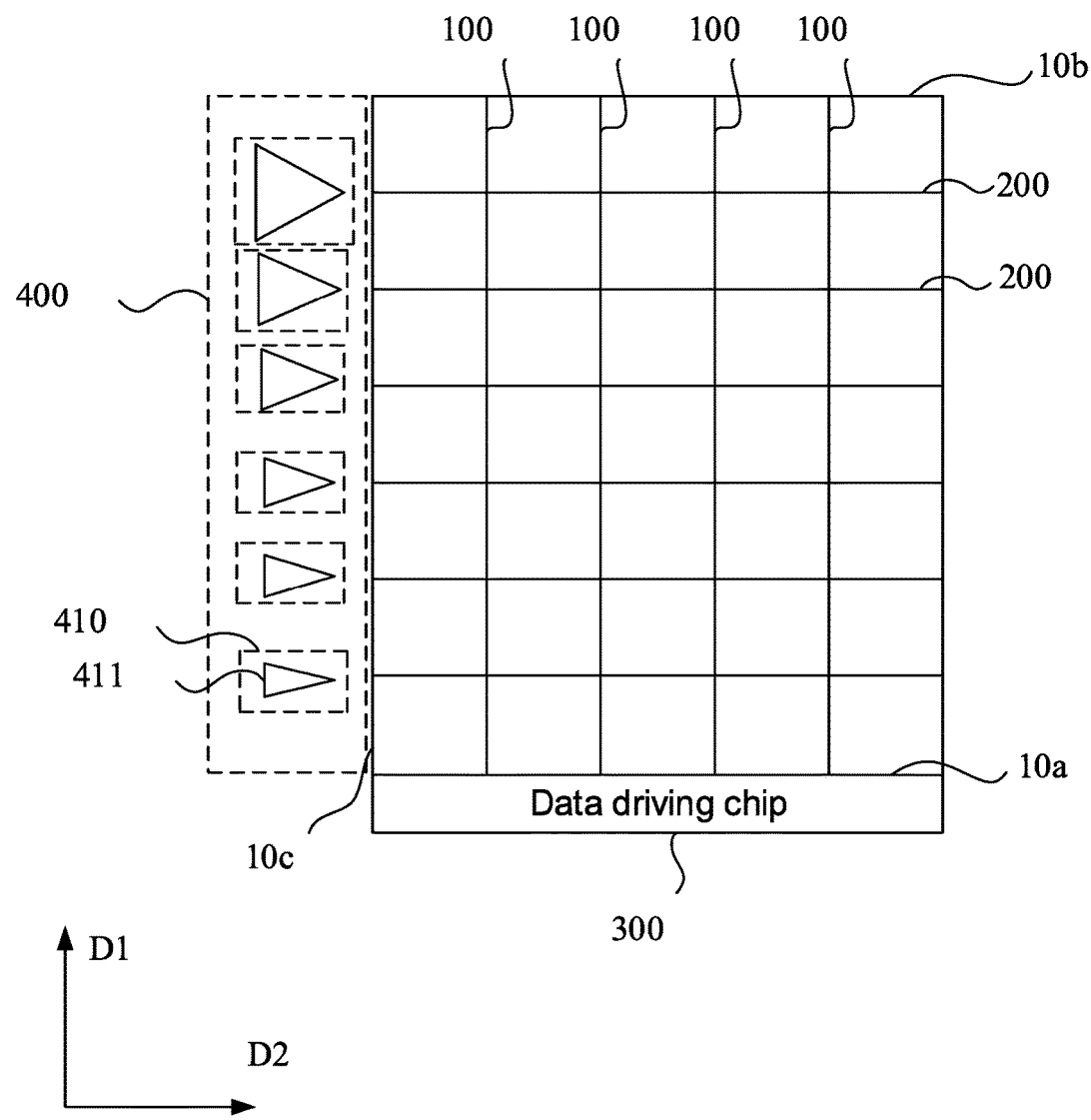
FIG. 1 is a schematic view of the liquid crystal panel in accordance with a first embodiment.
Figure 2:
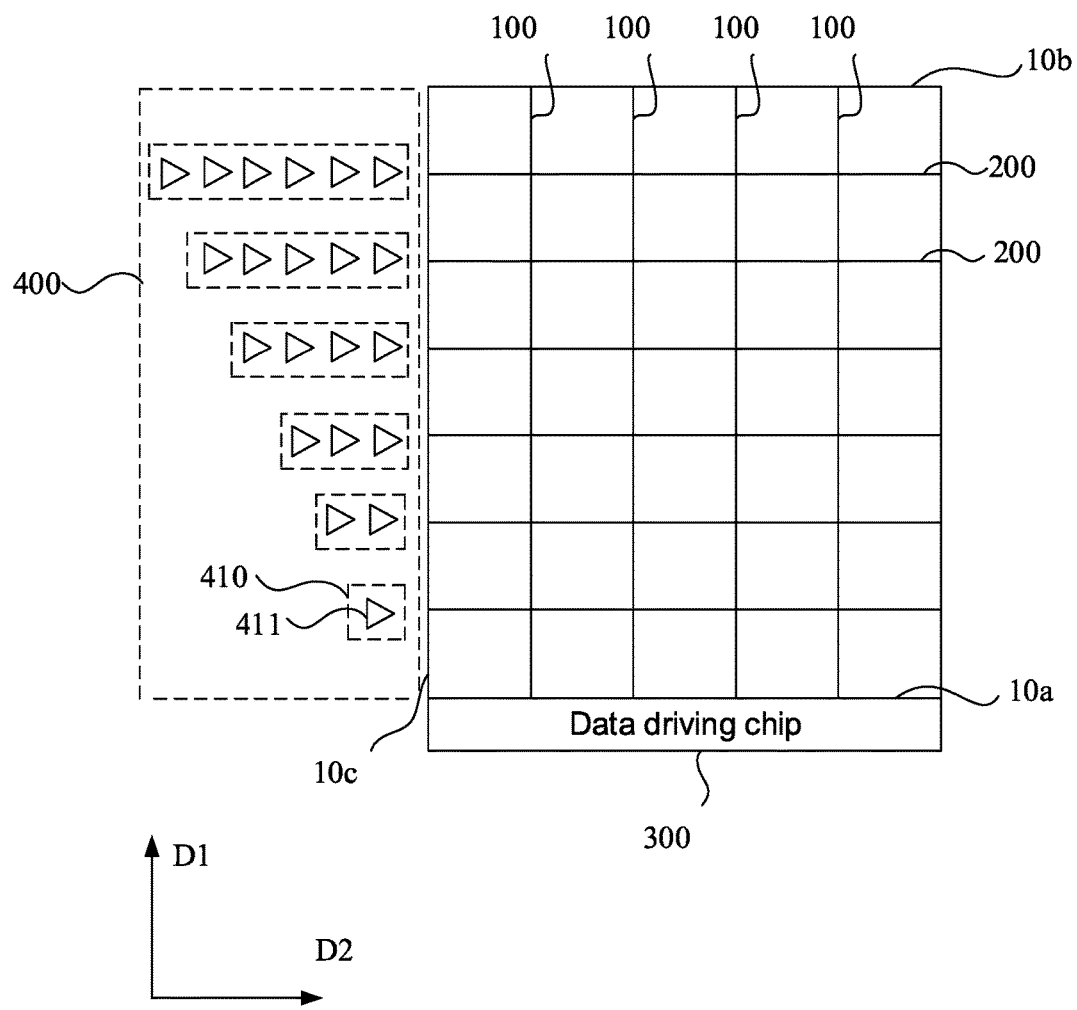
FIG. 2 is a schematic view of the liquid crystal panel in accordance with a second embodiment.

FIG. 1 is a schematic view of the liquid crystal panel in accordance with a first embodiment. FIG. 2 is a schematic view of the liquid crystal panel in accordance with a second embodiment. The liquid crystal panel 10 includes a plurality of data lines 100 and a plurality of gate lines 200. The data lines 100 extend along a first direction (D1) and are spaced apart along a second direction (D2). The gate lines 200 extend along the second direction (D2) and are spaced apart along the first direction (D1). The liquid crystal panel 10 includes a first side 10a, a second side 10b, and a third side 10c. The first side 10a is opposite to the second side 10b, and the direction from the first side 10a toward the second side 10b forms the first direction (D1), the third side 10c respectively intersects with the first side 10a and the second side 10b. The liquid crystal panel 10 also includes a data driving chip 300 and at least one GOA circuit 400. The data driving chip 300 is arranged to be close to the first side 10a, and is configured to provide data signals to the data lines 100. One of the GOA circuit 400 is arranged to be close to the third side 10c. The GOA circuit 400 includes a plurality of gate on array (GOA) units 410, each of the GOA units 410 includes a signal buffer 411. The signal buffer 411 is configured to buffer the received gate driving signals, and to provide the buffered gate driving signals to the corresponding gate lines 200. Dimensions of the signal buffer 411 of each of the GOA unit 410 are in an increasing order along a direction from the first side 10a toward the second side 10b. Alternatively, numbers of the signal buffers 411 of each of the GOA units 410 are in an increasing order along the direction from the first side 10a toward the second side 10b.

In one embodiment, as shown in FIG. 1, when the dimensions of the signal buffer 411 within each of the GOA unit 410 are gradually increased along the direction from the first side 10a to the second side 10b, the dimensions of the signal buffer 411 within each of the GOA unit 410 are linearly increased along the direction from the first side 10a to the second side 10b.

In one embodiment, as shown in FIG. 2, when numbers of the signal buffer 411 within each of the GOA unit 410 are gradually increased along the direction from the first side 10a to the second side 10b, the numbers of the signal buffer 411 within each of the GOA unit 410 are linearly increased along the direction from the first side 10a to the second side 10b.

Figure 3:
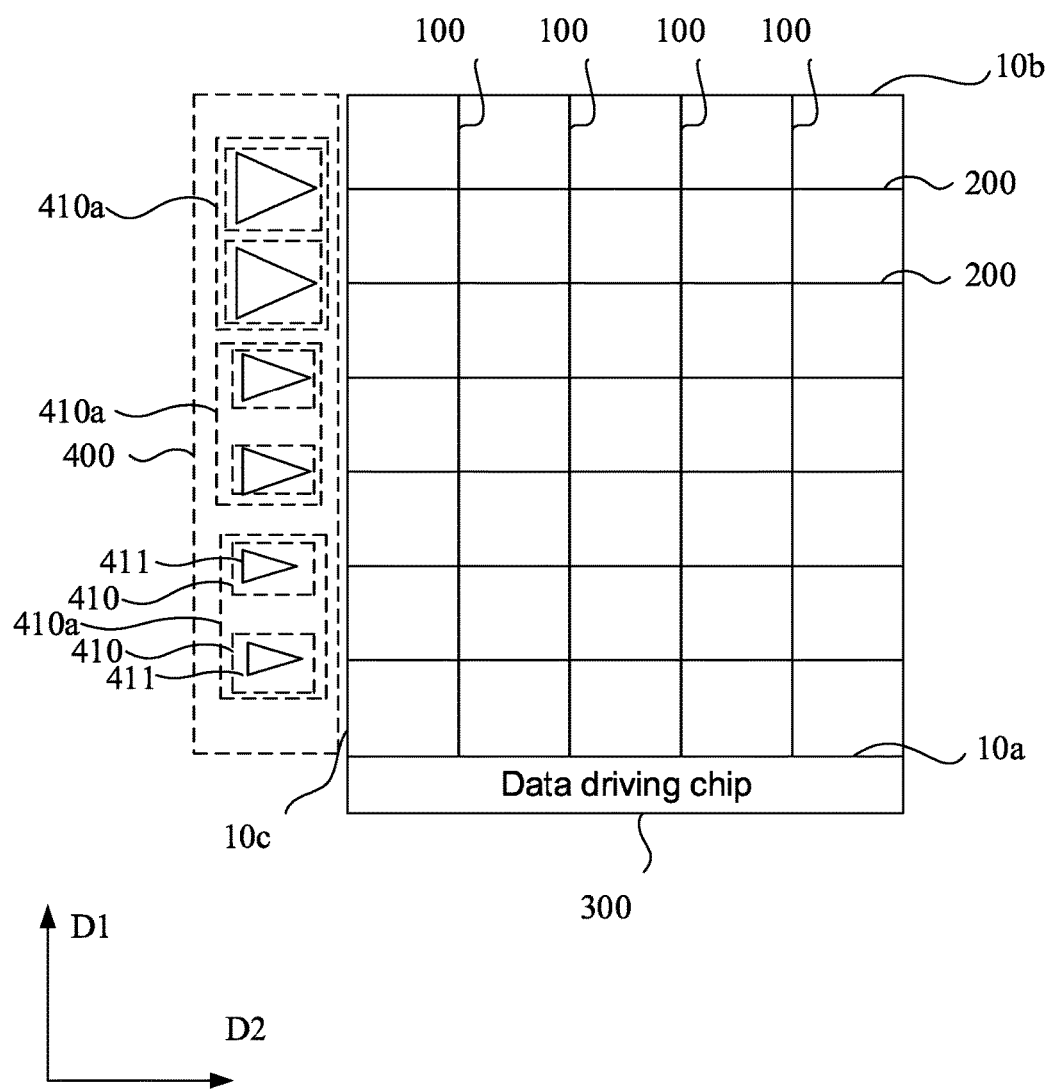
FIG. 3 is a schematic view of the liquid crystal panel in accordance with a third embodiment.

In one embodiment, as shown in FIG. 3, when the dimensions of the signal buffer 411 within each of the GOA unit 410 are gradually increased along the direction from the first side 10a to the second side 10b, starting from the first GOA unit 410 located close to the first side 10a, N number of adjacent GOA unit 410 are defined as a GOA unit set 410a, and different GOA unit set 410a includes different GOA units 410. With respect to the same GOA unit set 410a, the dimension of the signal buffer 411 are the same. With respect to different GOA unit set 410a, the dimensions of the signal buffer 411 within the GOA unit set 410a are linearly increased along the direction from the first side 10a to the second side 10b, wherein N is a positive integer. In FIG. 3, N equals to 2. It can be understood that, in other embodiments, N may be other positive integers.

Figure 4:
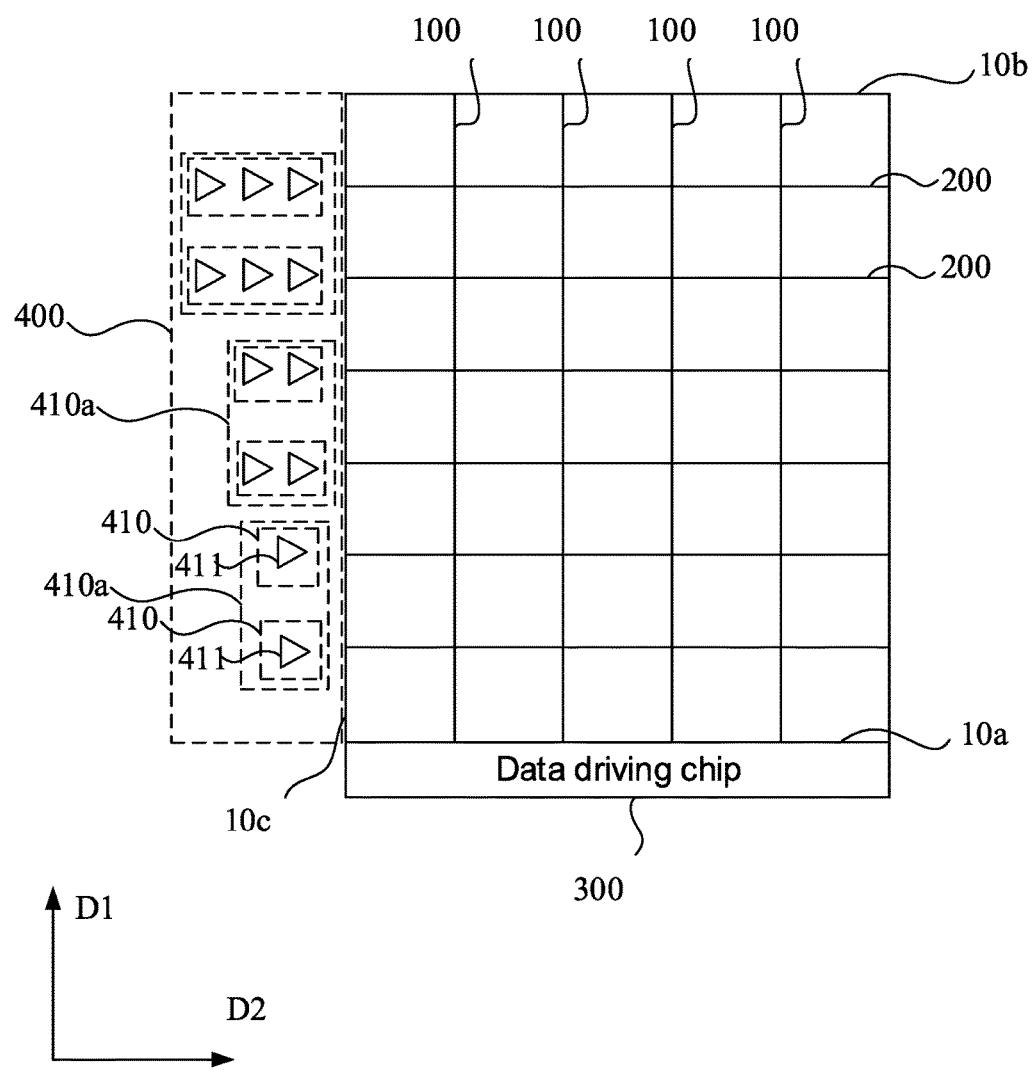
FIG. 4 is a schematic view of the liquid crystal panel in accordance with a fourth embodiment.

FIG. 4 is a schematic view of the liquid crystal panel in accordance with a fourth embodiment. When the numbers of the signal buffer 411 within each of the GOA units 410 are gradually increased along the direction from the first side 10a to the second side 10b, starting from the first GOA unit 410 located close to the first side 10a, the adjacent GOA units 410 corresponding to N number of gate lines 200 are defined as one GOA unit set 410a, and different GOA unit set 410a includes GOA units 410 corresponding to different gate lines 200. With respect to the same GOA unit set 410a, the numbers of the signal buffers 411 are the same. With respect to different GOA unit set 410a, the numbers of the signal buffer 411 within the GOA unit set 410a are linearly increased along the direction from the first side 10a to the second side 10b, wherein N is a positive integer. In FIG. 4, N equals to 2. It can be understood that, in other embodiments, N may be other positive integers.

Figure 5:
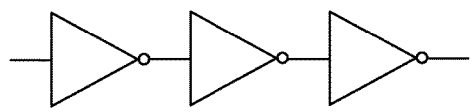
FIG. 5 is a schematic view of the signal buffer of the liquid crystal panel in accordance with one embodiment.

FIG. 5 is a schematic view of the signal buffer of the liquid crystal panel in accordance with one embodiment. In the embodiment, the signal buffer 411 includes a three-level reverse buffer.

It can be understood that the dimension of the signal buffer 411 includes the coverage of the signal buffer 411.

Figure 6:
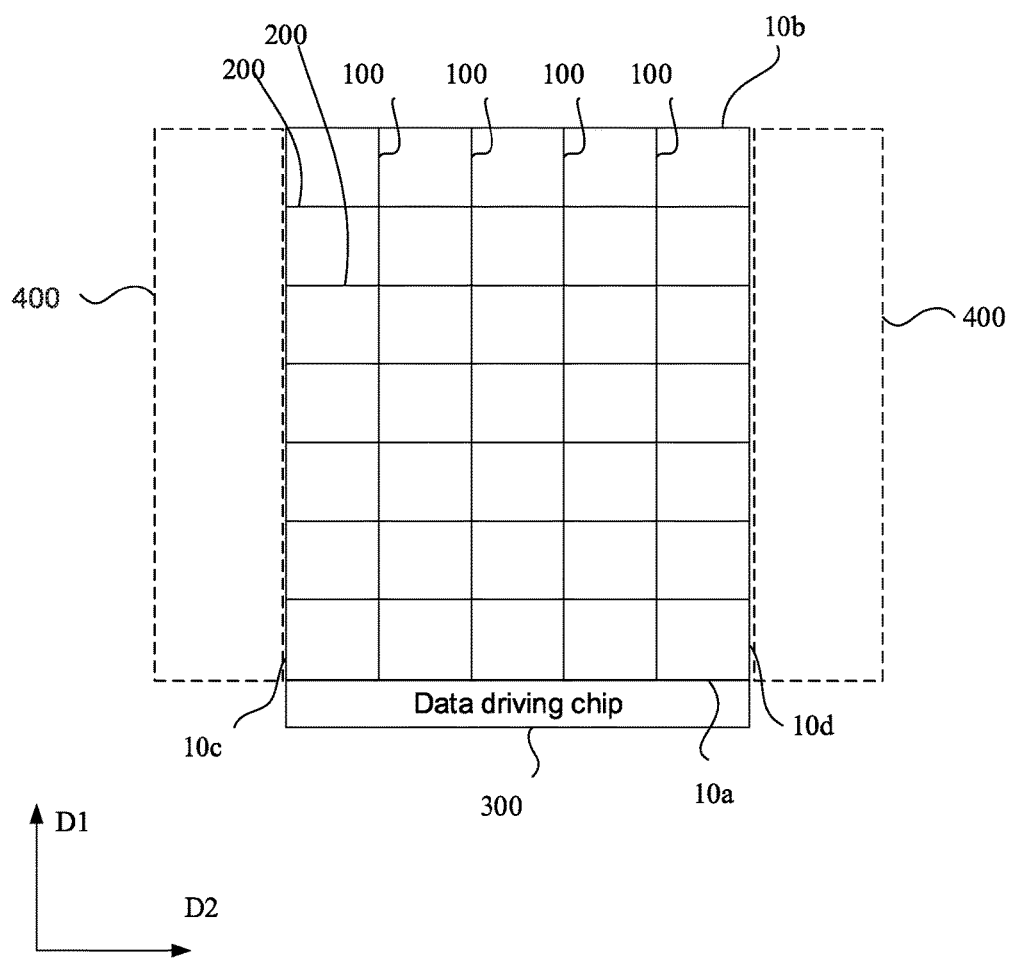
FIG. 6 is a schematic view of the liquid crystal panel in accordance with a sixth embodiment.

FIG. 6 is a schematic view of the liquid crystal panel in accordance with a sixth embodiment. In the embodiment, the liquid crystal panel 10 includes two GOA circuits 400, wherein one of the GOA circuits 400 is arranged to be close to the third side 10c, and the other GOA circuit 400 is arranged to be close to a fourth side 10d opposite to the third side 10c, wherein the fourth side 10d respectively intersects with the first side 10a and the second side 10b. In the embodiment, each of the GOA circuits 400 may be of the structure of the GOA circuit 400 disclosed in the above embodiments.

Figure 7:
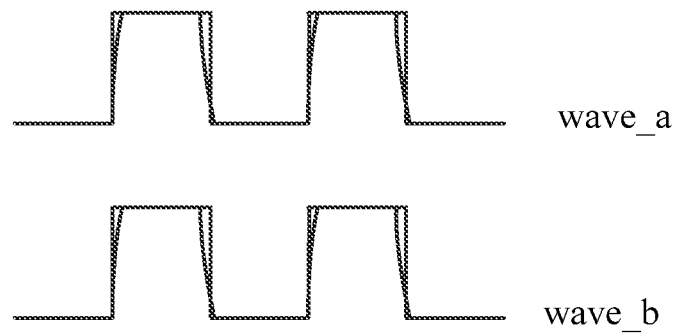
FIG. 7 is a waveform diagram showing the transmitted data signals on the data line close to a first side and close to a second side in accordance with one embodiment.

FIG. 7 is a waveform diagram showing the transmitted data signals on the data line close to a first side and close to a second side in accordance with one embodiment, wherein wave_a indicates the waveform of the transmitted data signals on the data lines 100 close to the first side 10a, and wave_b indicates the waveform of the transmitted data signals on the data lines 100 close to the second side 10b. It can be seen that the waveforms of the transmitted data signals close to the first side 10a or close to the second side 10b are substantially the same. Thus, by configuring the dimensions of the signal buffer 411 within each of the GOA unit 410 to be linearly increased along the direction from the first side 10a to the second side 10b, or by configuring the numbers of the signal buffer 411 within each of the GOA unit 410 to be linearly increased along the direction from the first side 10a to the second side 10b, the distortion among the data signals transmitted on the data line close to the second side 10b and the data line close to the first side 10a may be reduced, such that the uniformity of the image or the video displayed by the liquid crystal panel 10 may be enhanced.

Figure 8:
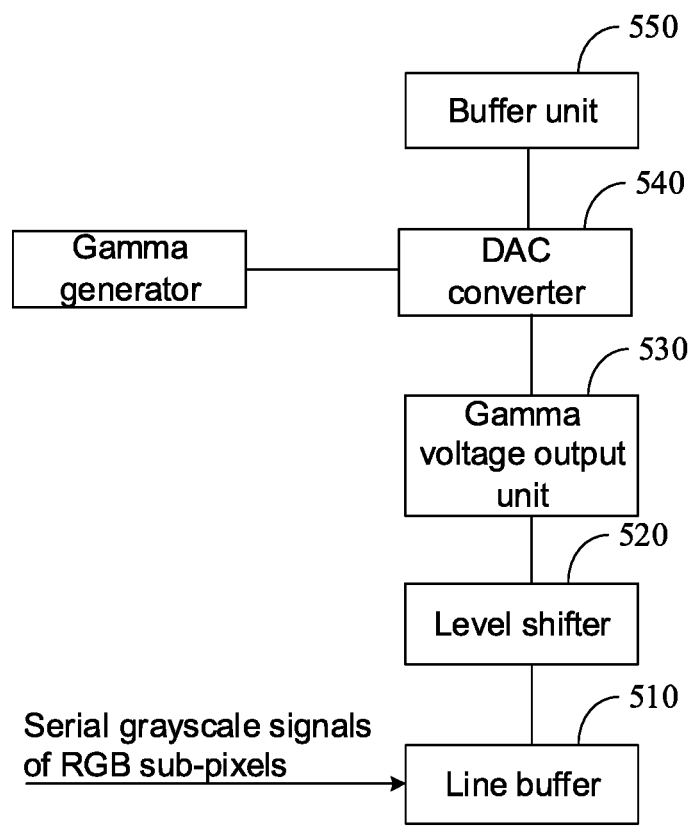
FIG. 8 is a circuit diagram of the Gamma voltage driving circuit of the liquid crystal panel in accordance with one embodiment.

FIG. 8 is a circuit diagram of the Gamma voltage driving circuit of the liquid crystal panel in accordance with one embodiment. The liquid crystal panel 10 includes a Gamma voltage driving circuit 500 having a line buffer 510, a level shifter 520, a Gamma voltage output unit 530, a digital-to-analog (DAC) converter 540, and a buffer unit 550. The line buffer 510 is configured to receive serial grayscale signals of RGB sub-pixels, and to convert the serial grayscale signals of RGB sub-pixels into parallel grayscale signals of the RGB sub-pixels, wherein the serial grayscale signals of the RGB sub-pixels are serial signals, and the parallel grayscale signals of the RGB sub-pixels are parallel signals. The level shifter 520 is configured to raise the voltage of the parallel grayscale signals of the RGB sub-pixel to a predetermined voltage. The Gamma voltage output unit 530 generates an analog Gamma voltage, and outputs the analog Gamma voltage to the DAC converter 540. The DAC converter 540 is configured to convert the analog Gamma voltage to a digital Gamma voltage in accordance with the parallel grayscale signals of the RGB sub-pixel having the raised voltage. Usually, the analog Gamma voltage is generated by the Gamma generator. The buffer unit 550 is configured to output the buffered digital Gamma signals to the corresponding pixel electrodes of the liquid crystal panel 10.

Figure 9:
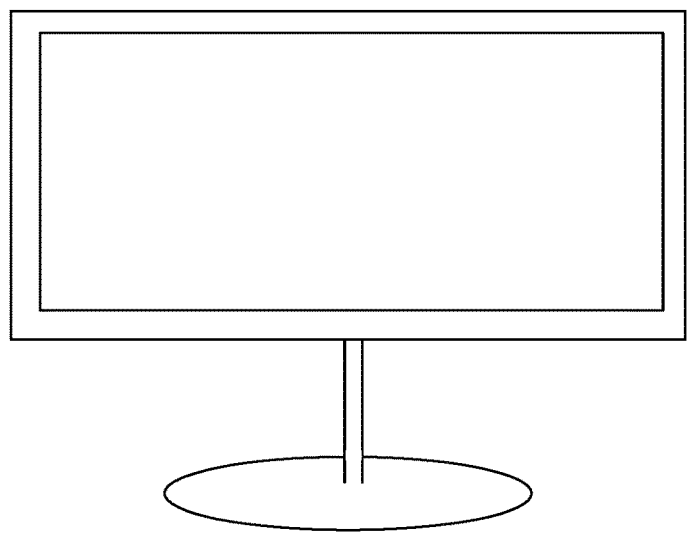
FIG. 9 is a schematic view of the LCD in accordance with one embodiment.

FIG. 9 is a schematic view of the LCD 1 in accordance with one embodiment. The LCD 1 may be, but not limited to, cellular phones, tablets, notebooks, desktop computers, palm computers, mobile internet devices (MIDs), and wearable devices. The LCD 1 may be any one of the liquid crystal panels 10 in the above embodiment.

Above are embodiments of the present invention, which does not limit the scope of the present invention. Any modifications, equivalent replacements or improvements within the spirit and principles of the embodiment described above should be covered by the protected scope of the invention.

What is claimed is:

1. A liquid crystal panel, comprising: a plurality of data lines and a plurality of gate lines, the data lines extend along a first direction and are spaced apart along a second direction, the gate lines extend along the second direction and are spaced apart along the first direction, the liquid crystal panel comprises a first side, a second side, and a third side, the first side is opposite to the second side, and the direction from the first side toward the second side forms the first direction, the third side respectively intersects with the first side and the second side, the liquid crystal panel also comprises a data driving chip and at least one gate on array (GOA) circuit, the data driving chip is arranged to be close to the first side, and is configured to provide data signals to the data lines, one of the GOA circuits is arranged to be close to the third side, the GOA circuit comprises a plurality of GOA units, each of the GOA units comprises a signal buffer, the signal buffer is configured to buffer received gate driving signals, and to provide the buffered gate driving signals to the corresponding gate lines, dimensions of the signal buffer of each of the GOA unit are in an increasing order along a direction from the first side toward the second side, or numbers of the signal buffers of each of the GOA units are in the increasing order along the direction from the first side toward the second side, wherein when the dimensions of the signal buffer within each of the GOA unit are gradually increased along the direction from the first side to the second side, starting from the first GOA unit located close to the first side, N number of adjacent GOA units are defined as a GOA unit set, and different GOA unit sets comprise different GOA units, with respect to the same GOA unit set, the dimensions of the signal buffer are the same, with respect to different GOA unit sets, the dimensions of the signal buffer within the GOA unit set are linearly increased along the direction from the first side to the second side, wherein N is a positive integer.

2. The liquid crystal panel as claimed in claim 1, wherein the signal buffer comprises a three-level reverse buffer.

3. The liquid crystal panel as claimed in claim 1, wherein the dimension of the signal buffer comprises a coverage of the signal buffer.

4. The liquid crystal panel as claimed in claim 1, wherein the liquid crystal panel comprises two GOA circuits, wherein one of the GOA circuits is arranged to be close to the third side, and the other GOA circuit is arranged to be close to a fourth side opposite to the third side, wherein the fourth side respectively intersects with the first side and the second side.

5. The liquid crystal panel as claimed in claim 1, wherein the liquid crystal panel comprises a Gamma voltage driving circuit having a line buffer, a level shifter, a Gamma voltage output unit, a digital-to-analog (DAC) converter, and a buffer unit, the line buffer is configured to receive serial grayscale signals of RGB sub-pixels, and to convert the serial grayscale signals of RGB sub-pixels into parallel grayscale signals of the RGB sub-pixels, wherein the serial grayscale signals of the RGB sub-pixels are serial signals, and the parallel grayscale signals of the RGB sub-pixels are parallel signals, the level shifter is configured to raise the voltage of the parallel grayscale signals of the RGB sub-pixel to a predetermined voltage, the Gamma voltage output unit generates an analog Gamma voltage, and outputs the analog Gamma voltage to the DAC converter, the DAC converter is configured to convert the analog Gamma voltage to a digital Gamma voltage in accordance with the parallel grayscale signals of the RGB sub-pixel having the raised voltage, the buffer unit is configured to output the buffered digital Gamma signals to corresponding pixel electrodes of the liquid crystal panel.

6. A liquid crystal device (LCD), comprising: a liquid crystal panel comprising a plurality of data lines and a plurality of gate lines, the data lines extend along a first direction and are spaced apart along a second direction, the gate lines extend along the second direction and are spaced apart along the first direction, the liquid crystal panel comprises a first side, a second side, and a third side, the first side is opposite to the second side, and the direction from the first side toward the second side forms the first direction, the third side respectively intersects with the first side and the second side, the liquid crystal panel also comprises a data driving chip and at least one gate on array (GOA) circuit, the data driving chip is arranged to be close to the first side, and is configured to provide data signals to the data lines, one of the GOA circuits is arranged to be close to the third side, the GOA circuit comprises a plurality of GOA units, each of the GOA units comprises a signal buffer, the signal buffer is configured to buffer received gate driving signals, and to provide the buffered gate driving signals to the corresponding gate lines, dimensions of the signal buffer of each of the GOA unit are in an increasing order along a direction from the first side toward the second side, or numbers of the signal buffers of each of the GOA units are in the increasing order along the direction from the first side toward the second side, wherein when the dimensions of the signal buffer within each of the GOA unit are gradually increased along the direction from the first side to the second side, starting from the first GOA unit located close to the first side, N number of adjacent GOA units are defined as a GOA unit set, and different GOA unit sets comprise different GOA units, with respect to the same GOA unit set, the dimensions of the signal buffer are the same, with respect to different GOA unit sets, the dimensions of the signal buffer within the GOA unit set are linearly increased along the direction from the first side to the second side, wherein N is a positive integer.

7. The LCD as claimed in claim 6, wherein the signal buffer comprises a three-level reverse buffer.

8. The LCD as claimed in claim 6, wherein the dimension of the signal buffer comprises a coverage of the signal buffer.

9. The LCD as claimed in claim 6, wherein the liquid crystal panel comprises two GOA circuits, wherein one of the GOA circuits is arranged to be close to the third side, and the other GOA circuit is arranged to be close to a fourth side opposite to the third side, wherein the fourth side respectively intersects with the first side and the second side.

10. The LCD as claimed in claim 6, wherein the liquid crystal panel comprises a Gamma voltage driving circuit having a line buffer, a level shifter, a Gamma voltage output unit, a digital-to-analog (DAC) converter, and a buffer unit, the line buffer is configured to receive serial grayscale signals of RGB sub-pixels, and to convert the serial grayscale signals of RGB sub-pixels into parallel grayscale signals of the RGB sub-pixels, wherein the serial grayscale signals of the RGB sub-pixels are serial signals, and the parallel grayscale signals of the RGB sub-pixels are parallel signals, the level shifter is configured to raise the voltage of the parallel grayscale signals of the RGB sub-pixel to a predetermined voltage, the Gamma voltage output unit generates an analog Gamma voltage, and outputs the analog Gamma voltage to the DAC converter, the DAC converter is configured to convert the analog Gamma voltage to a digital Gamma voltage in accordance with the parallel grayscale signals of the RGB sub-pixel having the raised voltage, the buffer unit is configured to output the buffered digital Gamma signals to corresponding pixel electrodes of the liquid crystal panel.

* * * * *